B. Tolman,
Shoe-Edge Plane.
N° 24,526. Patented June 21, 1859.

Witnesses,
Joseph Cobb
Thomas S. Stevens

Inventor
Benjamin Tolman

UNITED STATES PATENT OFFICE.

BENJAMIN TOLMAN, OF PEMBROKE, MASSACHUSETTS, ASSIGNOR TO HIMSELF AND ASA T. RAMSDELL, OF SAME PLACE.

EDGE-PLANE FOR BOOTS AND SHOES.

Specification of Letters Patent No. 24,526, dated June 21, 1859.

*To all whom it may concern:*

Be it known that I, BENJAMIN TOLMAN, of Pembroke, in the county of Plymouth and State of Massachusetts, have invented an Improved Edge-Plane for Soles of Boots or Shoes; and I do hereby declare that the same is fully described and represented in the following specification and the accompanying drawings, of which—

Figure 2:
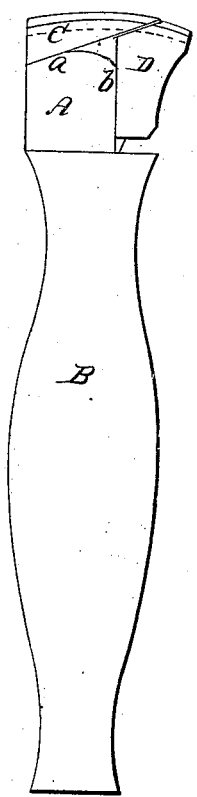
Figure 3:
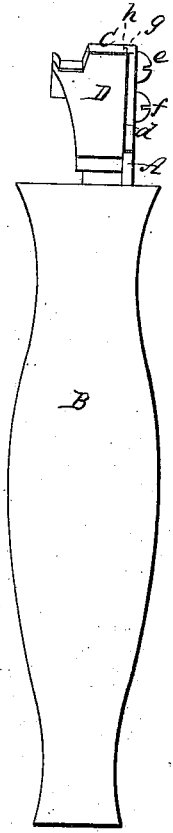
Figure 4:
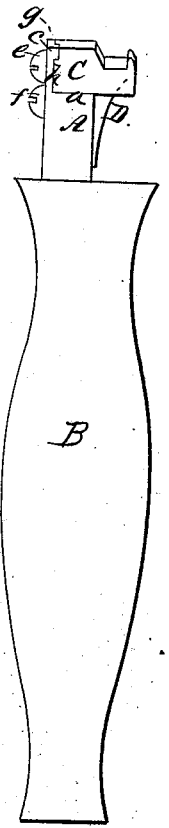
Figure 5:
Figure 1:
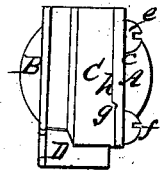
Figure 6:
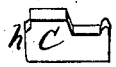

Figures 1, and 2, are front and side views. Figs. 3, and 4, are edge views; Fig. 5, a front view of the cutter stock, its cutter and gage flanches; Fig. 6, a rear view of the cutter.

The nature of my improvement consists in a new arrangement of devices for supporting the cutter and its gage.

In the drawings A, represents the cutter stock, projecting from a handle, B, and carrying a cutter or molding plane C, and a throat gage D. The stock I form with two bearings, or bearing surfaces $a$, $b$, for the cutter and gage to respectively rest against, the said bearings being arranged at an acute angle with each other. Against each of such bearings and so as to project from it at a right angle is a flanch $c$, or $d$, not only for giving additional support to the cutter or the gage, but for reception of one of two confining screws $e$, $f$, which pass through elongated slots in the flanches and screw respectively into the cutter and gage. Furthermore, the cutter flanch is furnished with a groove $g$, to receive a tongue $h$, extended from the backside of the cutter. Now, as the cutter projects beyond the front face of the stock, the tongue and groove serve to relieve the confining screw of the cutter from lateral strain while the instrument is in use. The very extended surface of the bearing flanch of the gage contributes greatly to maintain the gage in place.

One great advantage of the arrangement of fastening devices of the cutter and gage is that they admit of cutters and gages of different patterns or forms to be applied to the stock. The arrangement of the clamp screws is such that the strains on them are in longitudinal directions and not laterally so as to cause them to break as is often the case in other tools of the kind. The tool therefore as a whole presents many advantages as to strength, durability and ease of adjustment, as both cutter and gage are not only supported on two faces or edges of each, but their confining devices are so applied as to be relieved from all lateral strain.

Therefore what I claim is—

The improved edge plane as constructed with cutter and gage bearings, flanches and confining devices arranged on the stock and with respect to the cutter and gage substantially as specified.

In testimony whereof, I have hereunto set my signature.

BENJAMIN TOLMAN.

Witnesses:
 JOSEPH COBB,
 THOMAS G. STEVENS.